Nov. 5, 1968　　　　　P. L. TAYLOR　　　　　3,409,788
SPARK SUPPRESSOR FOR COMMUTATING ELECTRICAL MACHINES
Filed May 18, 1965　　　　　　　　　　　　　　2 Sheets-Sheet 1
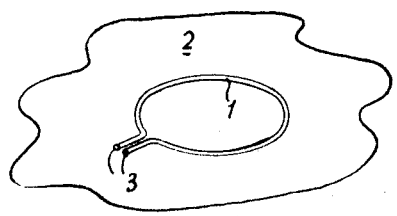
Fig. 1.
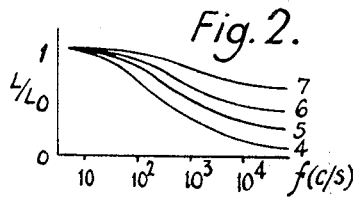
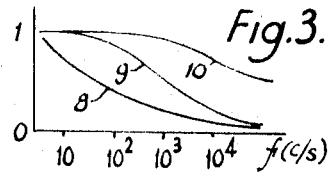
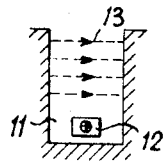
Fig. 4(a)
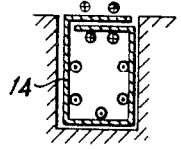
Fig. 4(b)
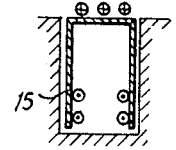
Fig. 4(c)
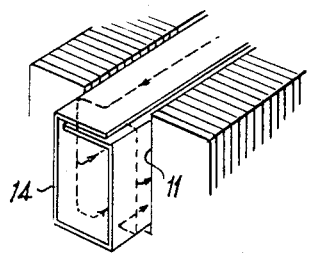
Fig. 4(A)
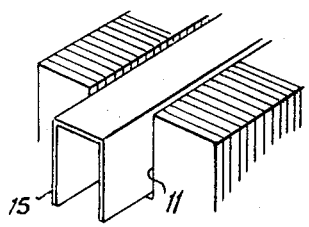
Fig. 4(B)
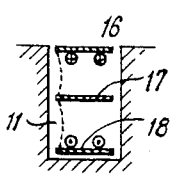
Fig. 4(d)
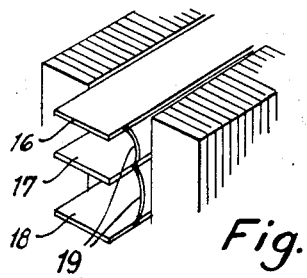
Fig. 4(D)

Nov. 5, 1968  P. L. TAYLOR  3,409,788
SPARK SUPPRESSOR FOR COMMUTATING ELECTRICAL MACHINES
Filed May 18, 1965  2 Sheets-Sheet 2

United States Patent Office 3,409,788
Patented Nov. 5, 1968

3,409,788
SPARK SUPPRESSOR FOR COMMUTATING
ELECTRICAL MACHINES
Philip Lester Taylor, Marple, Cheshire, England, assignor to Associated Electrical Industries Limited, London, England, a company of Great Britain
Filed May 18, 1965, Ser. No. 456,637
Claims priority, application Great Britain, May 26, 1964, 21,717
7 Claims. (Cl. 310—220)

ABSTRACT OF THE DISCLOSURE

For the commutator type machine having a commutator with armature coils connected thereto, a flux-trapping arrangement for suppressing sparking at the commutator by opposing abrupt changes of flux intensity and pattern and hence of stored energy which would accompany such sparking if unsuppressed. The arrangement includes a sheet-form conductive material so located in a flux zone surrounding the armature coils as to have eddy currents generated therein by incipient abrupt changes of flux in the zone. The eddy currents tend to oppose such changes and the thickness of the sheet material is such that, when the zone is traversed by flux which changes relatively slowly in normal action of the machine, the presence of the material will have insignificant effect as regards such slow flux changes.

---

This invention has for its objective the improvement of the commutation process in electrical machines of the commutator type, and in particular the suppression (that is elimination or reduction) of the sparking that occurs when the commutation process is imperfect.

When commutation of the current in any coil in such a machine is imperfect, then at the instant the commutator bar associated with the coil breaks contact with the brush there is an abrupt change of current in the coil which, because of the inductance of the coil, results in the self-induction of a voltage which may be high enough to cause a spark to pass between the commutator bar and the brush. Such sparking is undesirable because it causes erosion of the brush and commutator and because the consequent roughening of the commutator surface increases the frictional wear of the brush occasioned by the rotation of the commutator.

The abrupt change of current is associated with a change in the intensities of the magnetic fluxes linking the coil, and consequently a change in the energy stored in the magnetic field. The difference in the stored energies before and after the occurrence of a spark is the energy that is available for dissipation in the spark. The present invention is based on the concept, believed to represent a novel approach to the problem of spark suppression, of "freezing" or "trapping", at least to a significant extent, the intensity and pattern of the flux associated with the coil for the period when the current is changing abruptly. The stored energy is thereby held substantially constant, at least for the short period when a spark would otherwise occur, and there is therefore little or no energy available to sustain a spark. Consequently sparking is substantially reduced or eliminated.

The flux-trapping means of the present invention consists of sheet-form conductive material located in a flux zone surrounding the coils of the armature of a commutator type machine in such a manner that any tendency of flux in said zone to change abruptly will cause flow in the material of eddy-currents tending to oppose such change, the sheet thickness of the material being so chosen, in the event that said zone will also be traversed by flux which changes relatively slowly in the normal action of the machine, that the presence of said material will have relatively little or no effect as regards such slow flux change. It will be shown later that there is a readily determinable thickness, or range of thicknesses, which will satisfy this latter requirement.

Such choice of thickness is necessary in order that the inclusion of the flux-trapping means will not result in effects that interfere in an undesirable manner with the intended operation of the machine. Certain fluxes in the machine must vary in the course of the operation of the machine (doing so relatively slowly as compared with the abrupt flux changes which tend to give rise to sparking) and if such fluxes link with the flux-trapping sheet material without its thickness being properly chosen then eddy-currents will be set up which may be of sufficient magnitude to cause undesirable loss of energy and excessive heating of the flux-trapping means itself. Consequently either the flux-trapping material must be so positioned as not to link with fluxes which vary in the normal course of operation of the machine or the flux-trapping means must be designed so as to be substantially without effect on the necessary variations of flux which remaining effective to resist the flux changes which give rise to sparking.

Ideally, also when the flux-trapping material is provided on the rotating armature of the machine, it should provide no closed current path in which current may be induced by the motion of the armature in the main operating field of the machine, even if the flux in the latter is substantially constant.

In general the shape and extent of an individual flux trapping sheet should be such as to provide a conductive path in which the eddy currents may flow so as substantially to encircle the flux or portion of flux which the sheet is intended to trap: alternatively a number of suitably positioned sheets may be interconnected to provide such a path through their interconnection. It is also desirable for the flux trapping sheet material to be placed as close as possible to a coil by which flux to be trapped will be produced. This is because the magnetic field is usually most intense in the neighborhood of the coil. For example, for a straight conductor carrying current the intensity of flux at a point in the vicinity is inversely proportional to the distance of the point from the axis of the conductor. The energy stored in a field is proportional to the square of the intensity and hence the energy density is inversely proportional to the square of the distance of the point from the axis of the conductor. In order therefore to trap the majority of the energy associated with the current in the conductor a flux-trapping sheet should extend as close to the conductor as possible.

When an eddy current flows round a closed path it tends to "trap" the total flux linking that path but not necessarily its distribution: that is, on a change of total flux the eddy current tends to generate a compensating flux the magnitude of which is dependent on the magnitude of the change but the distribution of which may differ from the original distribution pattern. However, it can be shown that the energy stored in a volume of flux depends not only on the total flux but also on its distribution. Hence the flux trapping means which is provided in accordance with the present invention with the object of maintaining the stored energy substantially constant during such time as a spark may otherwise occur is required to trap both the intensity and the pattern of the flux as previously stated. The easiest way of doing this is to arrange the flux trapping sheet material so that it intercepts the flux lines substantially at right-angles. It is an experimental fact tha eddy-current will flow in a conductive sheet with such a distribution and intensity as to tend to trap the flux completely in the plane of the sheet: if the sheet is at right-angles to the flux then the trapping action is also effective to a useful extent in the volume of space in the vicinity of the sheet.

If disposition of the flux trapping material at right-angles to the flux lines is not practical for reasons of cost or manufacturing convenience, the trapping action will be less good unless the geometry of the flux to be trapped is known and the flux trapping material is so disposed as to provide the eddy current paths which the geometry of the flux dictates: in this latter case, as will be seen, efficient flux trapping can be achieved by conductive sheets lying substantially parallel to the flux lines, provided that the planes of the paths in which the eddy-currents flow are substantially perpendicular to the direction of the flux.

The sheet-form material used for the flux trapping means of the invention may be in homogenous sheet form or may consist of a "sheet" of wires or conductive strips, the thickness of the sheet then depending on the diameter of such wires or the thickness of such strips: such wires or strips would be disposed with their length extending in the direction of the required eddy current flow.

The principle on which the invention is based and various ways in which this principle can be applied in practice will be further described with reference to the accompanying drawings.

FIGURE 1 is a schematic drawing illustrating the principle of operation of the invention.

FIGURES 2 and 3 are graphs indicating typical experimental results and illustrating the relationship between inductance and frequency.

FIGURES 4(b) and 4(A) illustrate in cross-section and in perspective, respectively, one embodiment of the present invention.

FIGURES 4(c) and 4(B) illustrate in cross-section and in perspective, respectively, another embodiment of the present invention.

FIGURES 4(d) and 4(D) illustrate in cross-sectional view and in perspective view, respectively, another embodiment of the present invention.

Figure 4E:
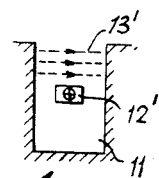
FIGURE 4(a) is a cross-sectional view of an armature slot illustrating a principle of the present invention.

FIGURE 4(e) is a cross-sectional view of an armature slot illustrating a principle of the present invention.

Figure 4F:
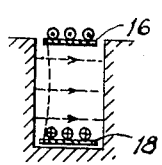

FIGURE 4(f) illustrates a cross-sectional view of an armature slot showing another embodiment of the present invention.

Figure 4G:
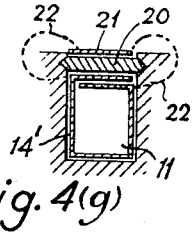
Figure 4G:
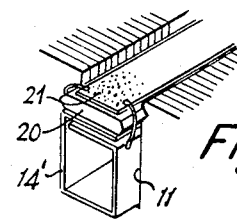

FIGURES 4(g) and 4(G) illustrate in cross-sectional view and in perspective view, respectively, another embodiment of the present invention.

Figure 5:
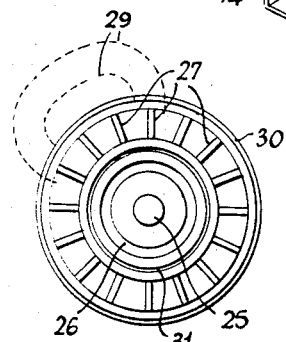
Figure 6:
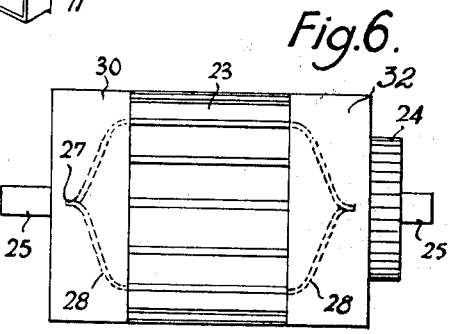

FIGURES 5 and 6 illustrate an end view and a side view respectively of a slotted rotor armature employing the features of the present invention.

Figure 7:
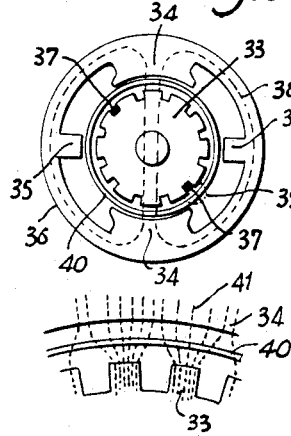

FIGURE 7 illustrates a two pole commutator machine employing the principles of the present invention.

Figure 8:
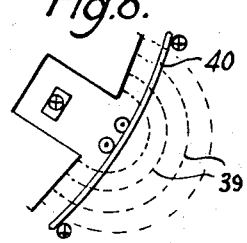
Figure 9:
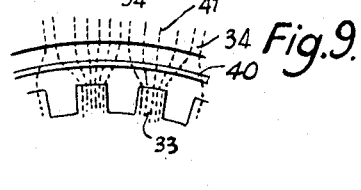

FIGURES 8 and 9 are partial sectional views of the machine shown in FIGURE 7.

Figure 10:
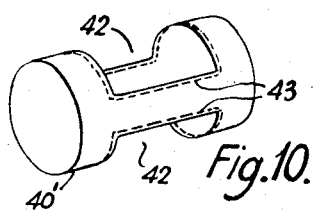

FIGURE 10 is a perspective view illustrating a flux-trap for use with the machine of FIGURES 7–9.

Referring to FIG. 1 there is shown a coil 1 of plane circular form placed parallel to but a finite distance from a sheet of conductive material 2. In the following discussion the effect of the pressure of the conductive sheet upon the inductance L of the coil 1, as measured at terminals 3, will be considered. This inductance is a measure of the energy E stored in the magnetic field associated with the coil when the latter carries a current $i$, the relationship being $E = \frac{1}{2}Li^2$. If the current $i$ varies, eddy-currents are induced in the sheet 2 in such a manner as to tend to keep the magnetic flux constant; but since the electromotive force induced in the sheet, and hence the consequent eddy-currents, depend on the rate of change of the current $i$, it follows that the effective value of inductance measured at the terminals 3 will be dependent on the rate of change of current: the more rapid the change of current, the less will be the effective inductance.

In the context of the present invention it is characteristic that the changes of currents in coils which give rise to sparks are very abrupt, and the sparks correspondingly last for only short periods (typically 1 to 10 microseconds). On the other hand, fluxes which are necessary to the operation of the machine and which may also link with the flux-trapping sheets vary relatively slowly. It is found by experiment that the thickness of a sheet of which a flux-trap is made may be chosen so that the flux-trap is effective in its action on rapid changes of flux but without significant effect on fluxes that change only slowly. To illustrate this, measurements have been made of the inductance in an arrangement such as is shown in FIG. 1, using sinusoidally-varying currents over a range of frequencies. For sinusoidally varying currents the rate of change of current is, of course, proportional to frequency, being greater at higher frequencies. For these illustrative experiments a sinusoidal wave-shape of current was employed, rather than wave-shapes more typical of those which are observed in commutator machines, because of the ease with which measurements could be made with readily available equipment. It is nevertheless possible to relate these experimental observations in a qualitative manner with the behaviour to be expected in a machine. For example, a rapid event such as a spark whose duration is typically $10^{-5}$ sec. corresponds approximately to a frequency of $1/(2\pi \times 10^{-5})$ c./s. = 16 kc./s., so that for a flux-trap to be effective it should show a reduction in the inductance of the coil with which it is associated at frequencies of this order and higher. By contrast, the most rapid change of flux occurring in the normal operation of a commutator machine is usually the reversal of a cross-slot flux, which may occur in about $10^{-3}$ sec. The corresponding frequency is $1/(2\pi \times 10^{-3}) = 160$ c./s. For a flux-trap to be ineffective on such flux reversal it should cause no change in inductance at frequencies of this order and lower.

Typical experimental results are indicated in FIGS. 2 and 3. Curves 4–7 in FIG. 2 show the variation with frequency of the measured inductance L expressed as a fraction of the inductance $L_0$ at low frequencies. For all these curves the thickness and material of the sheet 2 were the same. For curve 4 the sheet and coil were placed as close together as possible. It is seen that the inductance is unaffected at low frequencies but is much reduced at high frequencies. For curves 5, 6, 7 the sheet was moved progressively away from the coil and it will be observed that the effect on the inductance is much diminished. These results illustrate the importance of arranging the flux-trapping material as close to the coils as possible.

In the experiments whose results are plotted in FIG. 3 the sheet was in all cases made of copper and placed as close to the coil as possible, but different thicknesses of sheet were used. For curve 8 a comparatively thick sheet of about 0.064 inch was used; it will be observed that there is a considerable effect on the inductance even at low frequencies, and moreover the change from the value of inductance at low frequencies to that at high frequencies occurs over a wide range of frequencies. For curve 9 a thinner sheet of about 0.008 inch was used. There is little effect on the inductance at low frequencies, while the inductance at high frequencies is substantially the same as that with the thicker sheet. Furthermore the transition from the inductance at low frequencies to that at high frequencies occurs over a much narrower range of frequency, which is a desirable characteristic for the purposes of the invention. Curve 10 shows the results of using an even thinner sheet of about 0.004 inch. It will be observed that this has no effect at low frequencies but also has insufficient effect at high frequencies. These results demonstrate the ability to choose the thickness of the flux-trapping sheets to obtain the desired results. There is experimental evidence to show that the optimum thickness depends to some extent on the precise shape and positioning of the flux-traps and consequently the thickness of 0.008 inch mentioned in connection with curve 9 is not to be taken as limiting: copper sheeting of thicknesses somewhat greater or less than 0.008 inch may be employed. As there is experimental evidence to show that the flux-trapping material should have as low a resistivity as possible the use of copper is preferred. However, if some other material is employed then there is again experimental evidence to show that the optimum thickness of sheet is different (usually greater) than for copper.

The coils of the armature of a commutating machine are of more complicated shape than the circular coil 1. It is therefore necessary to consider in greater detail the fluxes associated with armature coils and the shapes of the flux-traps that are employed to link with the fluxes.

In FIG. 4(a) is shown in cross-section an armature slot 11 containing a current-carrying coil-side 12 which sets up a flux across the slot depicted by the lines 13. Such a flux may be trapped by a folded copper sheet 14 such as is shown in cross-section in FIG. 4(b) and in perspective in FIG. 4(A), the coil-side 12 being omitted in these figures for clarity. If the abrupt change of current in coil-side 12 is in the conventionally shown direction, then the cross-slot flux will intensify in the direction shown by the arrows on the lines 13. This intensification will be resisted by the flow of eddy-currents in the folded sheet 14 in the directions shown conventionally in FIG. 4(b) and by the dotted lines in FIG. 4(A). To provide a closed path for these eddy-currents the sheet 14 extends beyond each end of the slot in the manner indicated in FIG. 4(A): the return paths for the eddy-currents are provided by the portions of the sheet lying outside the slot. It is to be expected, and is confirmed experimentally, that if the sheet 14 is not extended beyond the slot and the eddy-currents have to follow return paths in the sheet within the slot the flux-trapping action is less effective at each end of the slot, since the eddy-currents do not then encircle the flux near the ends.

Another shape of flux-trap is shown in FIGS. 4(c) and 4(B) in cross-section and perspective respectively. This shape is not quite so effective as the previous one because there is no path for the eddy-currents to flow adjacent to the bottom of the slot. Any flux in this portion of the slot is therefore not fully encircled by the eddy currents.

Yet another design of slot flux-trap is shown in FIG. 4(d) in conjunction with FIG. 4(D). It consists of a number of conductive strips 16, 17, 18 of suitably selected thickness, which are conductively connected at both ends of the slot as indicated at 19. It will be seen that this arrangement also provides closed conductive paths which fully link the cross-slot flux, provided that one of the strips 16 is as close as possible to the top (open end) of the slot and another 18 is as close as possible to the bottom. Intermediate strips such as 17 are also desirable, for the reason now to be explained. In FIG. 4(e) is shown a current-carrying conductor 12' situated approximately in the middle of the slot 11. As is well known the flux 13' set up by such a conductor in the slot is confined to exist mainly between the position of the conductor and the open end of the slot: the region between the conductor and the bottom of the slot is substantially free of flux. If a flux-trap such as is shown in FIG. 4(d) is employed then the natural eddy-current path will be round strips 16 and 17 and their end-connections, since this is the path that links the flux most closely. Thus not only the intensity but also the distribution of the flux will be trapped. If, however, the strip 17 is omitted, then the eddy-currents are restricted to flow in the strips 16 and 18 as shown in FIG. 4(f). As previously indicated the effect of an eddy-current is to tend to hold constant the total flux linking the path of the eddy-current, but not necessarily to maintain the distribution of flux. Thus if the current depicted in conductor 12' in FIG. 4(e) is suddenly interrupted the total flux crossing the slot is held constant by the eddy-currents but the distribution would change to that shown in FIG. 4(f) if the flux trap were as depicted in this latter figure, that is, with no intermediate sheet such as 17. Now it is readily shown that less magnetic energy is stored in the configuration of FIG. 4(f) than in FIG. 4(e), even though the total fluxes are the same. The excess of energy is available for causing sparking, or in other words the flux-trap of FIG. 4(d) with the sheet 17 omitted would be less effective in controlling sparking in a coil occupying a position in the slot such as is shown in FIG. 4(e). It will be evident from the foregoing argument that it may be desirable, in the case of deep slots, to have additional strips such as 17 to link more closely with conductors in intermediate positions in the slots.

The forms of flux-trap just described may be used in combination if desired. For example, there is shown in FIGS. 4(g) and 4(G) a slot of the form in which the winding is retained within the slot by the use of a conventional slot wedge 20. In this case it is not possible for a flux-trap of the form shown in FIG. 4(b) to extend to the top of the slot. The flux crossing the slot through the wedge may be trapped by affixing a longitudinal copper strip 21 to the outer face of the wedge 20, and connecting it conductively to the folded sheet 14' within the slot at both ends as indicated at 22. This arrangement can be regarded as a combination of the flux-traps shown in FIGS. 4(b) and 4(d).

All the forms of slot flux-trap shown must be electrically isolated from the armature laminations to avoid the establishment of closed conductive paths in which the rotation of the armature in the main flux of the machine could generate excessive currents liable to cause overheating or damage.

These forms of flux-trap with their suitably chosen sheet thicknesses are to be distinguished from some so-called damper winding arrangement which involve the provision of conductors extending along the slots but which require to be relatively thick because they are intended to respond to the relatively slow reversal of cross-slot flux occurring as the armature coil passes through the commutating zone. Such damping windings also tend to suppress sparking but do so on a principle completely different from that on which the present invention is based. The flux-traps of the present invention are less bulky than these damper windings, take up less slot space and produce less loss.

Another flux-trapping arrangement is shown in FIGS. 5 and 6 which represent an end-on view and side view of the slotted rotor armature 23 (FIG. 6) of a commutator machine having its commutator 24 mounted at one end on the rotor shaft 25. FIG. 5 shows at the opposite end, in addition to the shaft 25, an end-winding support 26 and the noses 27 of the end-winding of the armature coils, such as are indicated at 28 in FIG. 6. There is also shown by the dotted lines 29 in FIG. 5 the lines of the magnetic flux set up by a typical current flowing in one of the coils in the end-winding. To intercept such a flux, and similar fluxes which are set up by all the coils in the end-winding, there is provided a flux-trap 30 taking the form of a cylindrical conductive sheet of suitably chosen thickness mounted externally over the end-winding. A considerable portion of the flux 29 flows through the end-winding support 26 and this portion of the flux may be intercepted by a flux trap 31 taking the form of a cylindrical conductive sheet of suitably chosen thickness mounted between the end-winding and the end-winding support 26. Both cylinders 30 and 31 should extend somewhat beyond the noses 27 of the end-winding: they must be insulated from the end-winding, but apart from this should be as close to the end-winding as possible. In FIG. 5, for the sake of clarity, the flux-trapping cylinders, the end-winding and the end-winding support have been shown radially separated from each other to a greater degree than they would be in practice. A similar flux-trap surrounding the end-winding at the commutator end is shown at 32 in FIG. 6 and it is also desirable for a cylindrical flux-trap to be provided internally of the end-winding at the commutator end similarly to 31 at the other end.

It will be appreciated that if slot flux-traps are provided as previously described the end winding flux-traps such as 30, 31, 32 must be insulated from them as otherwise there would exist through the flux-traps closed conductive paths similar to those in the familiar squirrel-cage rotor. This would permit the flow of eddy-currents which would seriously interfere with the normal operation of the machine.

A further form of flux-trap is illustrated by FIG. 7, which represents a cross-section through a two-pole commutator machine. There are shown the slotted armature 33, main pols 34, interpoles 35 and yoke casing 36. In one pair of slots is shown the cross-section of an armature coil 37, in the angular position at which the associated commutator bar is just breaking contact with the brush. A current in a coil in this position will set up fluxes of which two are of major importance, namely, a flux passing through the armature, main poles and casing as shown by the dotted lines 38 in FIG. 7, and a flux passing between the tips of the armature teeth on either side of the slot containing the conductor 37 as shown by the dotted lines 39 in the enlarged fragmentary view shown in FIG. 8. The distinguishing feature of these fluxes is that they pass through the cylindrical surface of the armature. They can be intercepted by a flux-trap 40 in the form of a cylindrical conductive sheet which has an internal diameter just greater than the diameter of the armature and which extends at least the length of the slotted portion of the armature and preferably over the end-windings also. For maximum flux-trapping effect the flux-trap would be mounted on the armature so as to rotate with it, but this is not practicable because it would result in the induction in the flux-trap of excessively eddy-currents, due to its rotation in the main excitation field of the machine. The effectiveness of the flux-trap is little diminished, however, if it is mounted so as to remain stationary; this is because coils undergoing commutation always occupy substantially the same position relative to the stationary parts of the machine, so that the abruptly changing fluxes it is desired to trap are also substantially stationary.

Even though the flux-trap 40 in FIGS. 7 and 8 remains stationary, the rotation of the armature can cause certain undesirable eddy-currents to flow. These eddy-currents are of a type similar to those occurring in connection with the phenomenon usually known as "tooth-ripple loss." Considering FIG. 9 there is shown in fragmentary cross-section a portion of the region under a main pole 34 with the slotted armature 33 and the flux-trap 40. There are also shown lines 41 representing the excitation flux of the machine. In the interior of the main pole 34 this flux is uniformly distributed, but as it crosses the air-gap it is concentrated to flow mainly in the teeth of the armature. Consequently as the armature rotates individual points on the flux-trap 40 will experience a variation in the intensity of the flux. The effect is that in the region under the main pole the flux-trap 40 may have induced in it undesirable eddy-currents which, because the fluxes in this region are usually intense, may be sufficiently strong to cause overheating of the flux-trap. This can be avoided by removing those parts of the flux-trap 40 which lie under the main poles, leaving the flux-trap with the form 40' shown in FIG. 10 having a "window" 42 for each main pole. (For a machine having a greater number of poles the flux-trap 40' would have a correspondingly greater number of such windows.) That this windowed construction does not substantially affect the effectiveness of the arrangement in trapping abrupt changes of flux through the main poles may be seen from reference to FIG. 7. During abrupt changes of flux, occurring in, say, 10 microseconds, the armature 33 rotates a negligible amount and consequently the spatial distribution of the flux 38 in the region of the air-gap, which distribution is determined substantially by the shapes and positions of the iron surfaces bounding the air-gap, remains virtually constant. Thus the intensity at any point in the gap will be proportional to the total amount of flux crossing the gap. It suffices therefore to trap the total flux, which may be done by providing a closed conducting path encircling the air-gap. A flux-trap in the form 40' of FIG. 10 provides such a path as is shown by the dotted lines 43. It will be appreciated that tooth-ripple effects will still be manifest in regions where the flux-trap 40 has not been cut away: for example, looking at FIG. 8 the flux 39 is locally concentrated at the teeth of the armature, so that motion of the armature will cause eddy-currents in the flux-trap 40. However, the resulting losses in this region are acceptably small because a major part of the path of the flux 39 lies in air and the flux therefore is relatively much less intense than in the air-gap under the main poles. The flux-trap 40 should not be made of sheet which is thicker than is necessary to secure the flux-trapping action. Sheet any thicker than this will not improve the flux-trapping action, and would only serve to permit the flow of unnecessarily large eddy-currents arising from the cause just explained.

What I claim is:

1. In a commutator type machine having a commutator with armature coils connected thereto, the improvement comprising a flux-trapping means for suppressing sparking at the commutator by opposing abrupt changes of flux intensity and pattern and hence of stored energy which would accompany such sparking if suppressed, said means comprising a sheet-form conductive material so located in a flux zone surrounding the armature coils so as to have eddy currents generated therein by an incipient abrupt change of flux in said zone, said eddy currents tending to oppose such change, and thickness of the said sheet material being such that, in the event that said zone is traversed by flux which changes relatively slowly in normal action of the machine, the presence of said material will have insignificant effect as regards such slow flux change, and wherein said armature coils are constituted by slot-contained conductors, the flux trapping means comprises slot-contained folded conductive sheet material embracing the slot conductors at least over the sides and top of the slot, said sheet material being so thin as to be sensitive to abrupt changes of flux surrounding the slot conductors but to be substantially insensitive to relatively slow changes occurring in such flux during normal operation.

2. The improvement according to claim 1 wherein the said sheet material extends also across the bottom of the slot and at the top of the slot it extends inwardly from opposite sides in overlapping fashion.

3. The improvement according to claim 1 wherein the said sheet material extends axially beyond the ends of the slots.

4. In a commutator type machine having a commutator with armature coils connected thereto, the improvement comprising a flux-trapping means for suppressing sparking at the commutator by opposing abrupt changes of flux intensity and pattern and hence of stored energy which would accompany such sparking if suppressed, said means comprising a sheet-form conductive material so located in a flux zone surrounding the armature coils so as to have eddy currents generated therein by an incipient abrupt change of flux in said zone, said eddy currents tending to oppose such change, and the thickness of the said sheet material being such that, in the event that said zone is traversed by flux which changes relatively slowly in normal action of the machine, the presence of said material will have insignificant effect as regards such slow flux change, and wherein said armature coils are constituted by slot-contained conductors, the flux trapping means comprises in each slot a plurality of transverse spaced conductive strips conductively interconnected at both ends of the slot and constituted by sheet material so thin as to be sensitive to abrupt changes of flux surrounding the slot conductors but to be substantially insensitive to relatively slow changes occurring in such flux during normal operation.

5. In a commutator type machine having a commutator with armature coils connected thereto, the improvement comprising a flux-trapping means for suppressing sparking at the commutator by opposing abrupt changes of flux intensity and pattern and hence of stored energy which would accompany such sparking if suppressed, said means comprising a sheet-form conductive material so located in a flux-zone surrounding the armature coils so as to have eddy currents generated therein by an incipient abrupt change of flux in said zone, said eddy currents tending to oppose such change, and the thickness of the said sheet material being such that, in the event that said zone is traversed by flux which changes relatively slowly in normal action of the machine, the presence of said material will have insignificant effect as regards such slow flux change, and wherein said armature coils are constituted by slot-contained conductors retained in position by slot wedges across the tops of the slots, said flux trapping means comprising for each slot, slot-contained folded conductive sheet material embracing the slot conductors beneath the slot wedge and further conductive sheet material in the form of a conductive strip affixed to the outsides of said wedge and conductively connected to the slot-contained sheet material, the folded and strip-form sheet material being so thin as to be sensitive to abrupt changes of flux surrounding the slot conductors but to be substantially insensitive to relatively slow changes occurring in such flux during normal operation.

6. In a commutator type machine having a commutator with armature coils connected thereto, the improvement comprising a flux-trapping means for suppressing sparking at the commutator by opposing abrupt changes of flux intensity and pattern and hence of stored energy which would accompany such sparking if suppressed, said means comprising a sheet-form conductive material so located in a flux zone surrounding the armature coils so as to have eddy currents generated therein by an incipient abrupt change of flux in said zone, said eddy currents tending to oppose such change, and the thickness of the said sheet material being such that, in the event that said zone is traversed by flux which changes relatively slowly in normal action of the machine, the presence of said material will have insignificant effect as regards such slow flux change, and wherein said armature coils are formed with end windings and the flux trapping means comprises conductive sheet material cylindrically surrounding said end windings.

7. In a commutator type machine having a commutator with armature coils connected thereto, the improvement comprising a flux-trapping means for suppressing sparking at the commutator by opposing abrupt changes of flux intensity and pattern and hence of stored energy which would accompany such sparking if unsuppressed, said means comprising a sheet-form conductive material so located in a flux zone surrounding the armature coils so as to have eddy currents generated therein by an incipient abrupt change of flux in said zone, said eddy currents tending to oppose such change, and the thickness of the said sheet material being such that, in the event that said zone is traversed by flux which changes relatively slowly in normal action of the machine, the presence of said material will have insignificant effect as regards such slow flux change, and wherein said flux trapping means comprises stationary cylindrical sheet material closely embracing the armature between it and said field structure and extending at least the length of the armature slots, said sheet material being so thin as to be sensitive to abrupt changes of flux surrounding the slot conductors but to be substantially insensitive to relatively slow changes occurring in such flux during normal operation and wherein said cylindrical sheet material has windows formed therein beneath said main poles.

References Cited

UNITED STATES PATENTS

| 1,537,737 | 5/1925 | Bergman | 310—197 XR |
| 500,301 | 6/1893 | Stanley et al. | 310—183 |
| 626,172 | 5/1899 | Lamme | 310—183 |
| 2,063,340 | 12/1936 | Rubey | 310—183 |
| 2,683,230 | 7/1954 | Mickelson | 310—183 |

FOREIGN PATENTS

| 26,911 | 12/1908 | Great Britain. |
| 326,891 | 4/1930 | Great Britain. |

MILTON O. HIRSHFIELD, *Primary Examiner.*

D. F. DUGGAN, *Assistant Examiner.*